US006664568B2

United States Patent
Lai (10) Patent No.: US 6,664,568 B2
(45) Date of Patent: Dec. 16, 2003

(54) LASER REPAIR FACILITATED PIXEL STRUCTURE AND REPAIRING METHOD

(75) Inventor: Han-Chung Lai, Taoyuan Hsien (TW)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 10/248,404

(22) Filed: Jan. 16, 2003

(65) Prior Publication Data

US 2003/0146435 A1 Aug. 7, 2003

(30) Foreign Application Priority Data

Feb. 6, 2002 (TW) .......................... 91102060 A (51) Int. Cl.[7] .......................... H01L 29/04; H01L 31/20; H01L 31/036; H01L 31/0376
(52) U.S. Cl. ............................ 257/59; 257/66; 349/192
(58) Field of Search ...................... 438/30, 149, 151; 349/55, 142, 143, 192; 257/59, 66, 72

(56) References Cited

U.S. PATENT DOCUMENTS 5,828,433 A  * 10/1998 Shin ........................... 349/147
5,995,178 A  * 11/1999 Fujikawa et al. ............. 349/55
5,998,229 A  * 12/1999 Lyu et al. ..................... 438/30
6,512,243 B1 *  1/2003 Kim et al. .................... 257/59
6,573,532 B2 *  6/2003 Park ............................ 257/59

* cited by examiner

Primary Examiner—Long Pham
Assistant Examiner—Hoai Pham
(74) Attorney, Agent, or Firm—Jiang Chyun IP Office (57) ABSTRACT

A laser repair facilitated pixel structure and repair method. The pixel structure includes a thin film transistor, a pixel electrode, and a conductive line. Control of the pixel structure is carried out through signals passing to a scan line and a data distributing line. The conductive line is underneath the data distributing line. The conductive line has a connective section and a repair section at each end of the connective section. Each repair section occupies an area greater than the data distributing line. A broken data distributing line is repaired through the formation of an electrical connection between the repair sections at each end of the conductive line and the data distributing line.

9 Claims, 11 Drawing Sheets

LASER REPAIR FACILITATED PIXEL STRUCTURE AND REPAIRING METHOD

CROSS REFERENCE TO RELATED APPLICATIONS

This application claims the priority benefit of Taiwan application serial no. 91102060, filed Feb. 6, 2002.

BACKGROUND OF INVENTION

1. Field of Invention

The present invention relates to a thin film transistor liquid crystal display (TFT-LCD) pixel structure. More particularly, the present invention relates to a laser repair facilitated pixel structure and repairing method.

2. Description of Related Art

A thin film transistor liquid crystal display (TFT-LCD) mainly includes a thin film transistor (TFT) array substrate board, a color filter array substrate board and a liquid crystal layer. The TFT array substrate board comprises an array of thin film transistors and a pixel electrode for each thin film transistor. The thin film transistor further comprises a gate electrode, a channel layer, a source terminal and a drain terminal. The thin film transistor serves as a switching element for each liquid crystal display cell.

Figure 1:
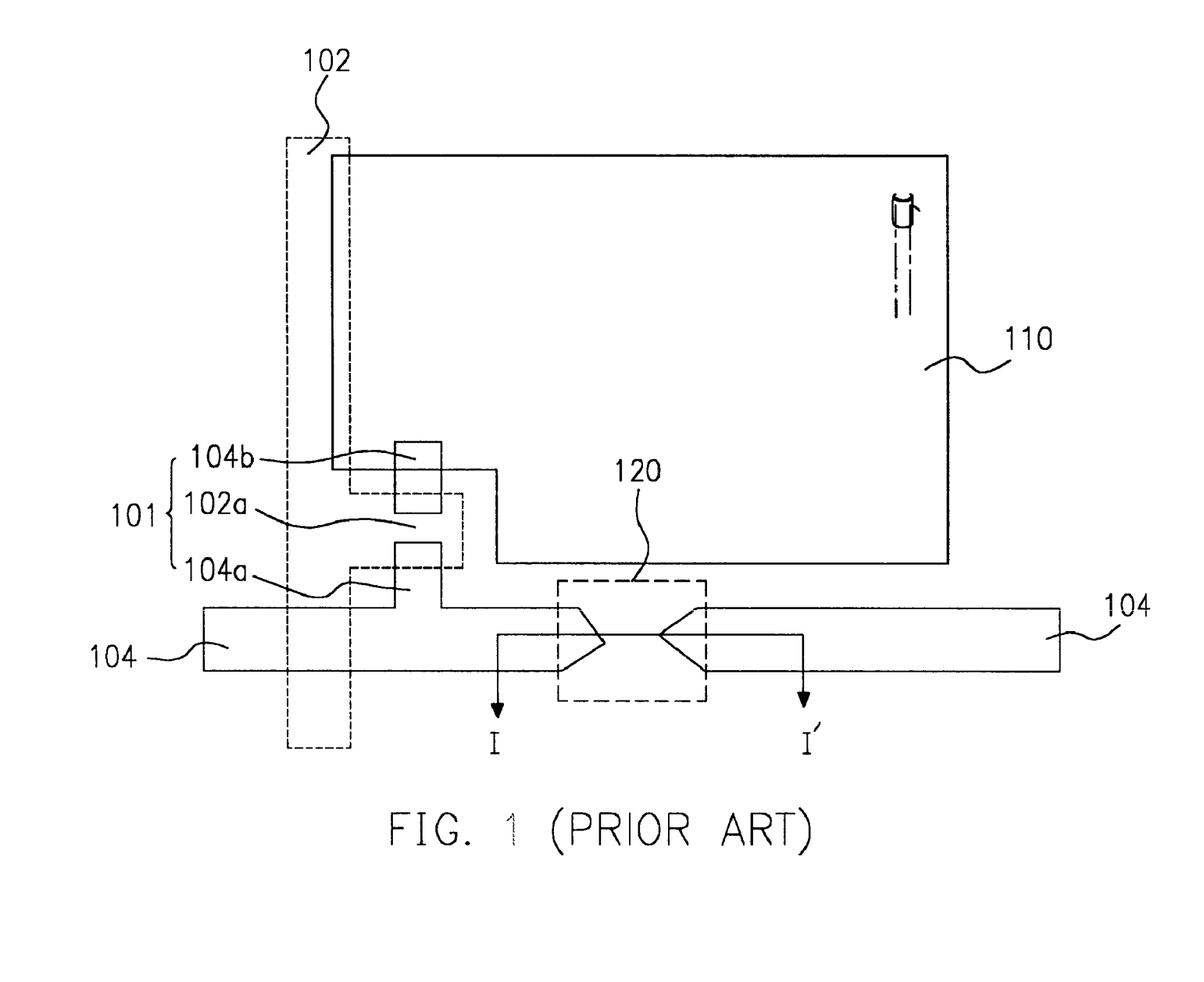
FIG. 1 is a schematic top view of a conventional pixel structure.

FIG. 1 is a schematic top view of a conventional pixel structure. As shown in FIG. 1, a pixel structure mainly comprises a thin film transistor 101 and a pixel electrode 110. The pixel is controlled through a scan line 102 and a data line 104. The thin film transistor 101 of the pixel structure further includes a gate terminal 102a, a source terminal 104a and a drain terminal 104b. The drain terminal 104a connects electrically with the data line 104. The gate electrode 102a of the thin film transistor 101 connects electrically with the scan line 102. The source terminal 104b of the thin film transistor 101 connects electrically with the pixel electrode 110. Each pixel electrode 110 corresponds with a thin film transistor 101.

When a break 120 on the data line 104 occurs, a repairing step needs to be conducted so that the ends of the data line 104 at the break region 120 are electrically connected back together. Several methods of repairing a severed data line have been developed. One of the methods is explained with reference to FIGS. 2A to 2C below.

Figure 2A:
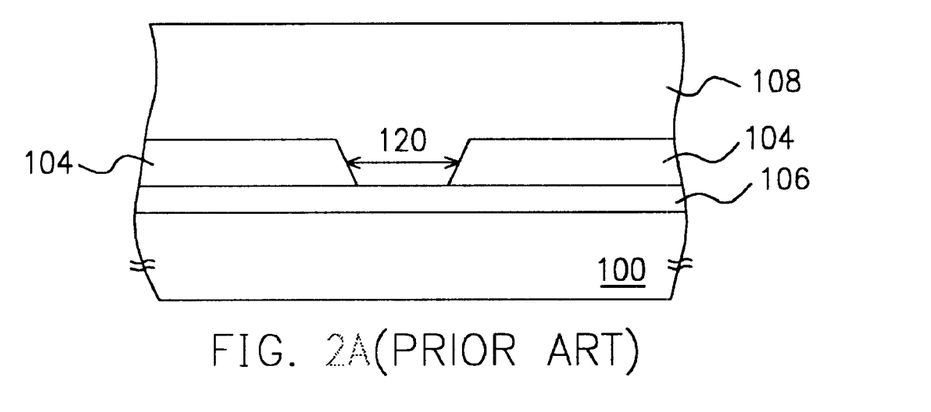
FIGS. 2A to 2C are schematic cross-sectional views along line I–I" of FIG. 1 showing the steps for repairing a broken data line using a laser beam.
Figure 2B:
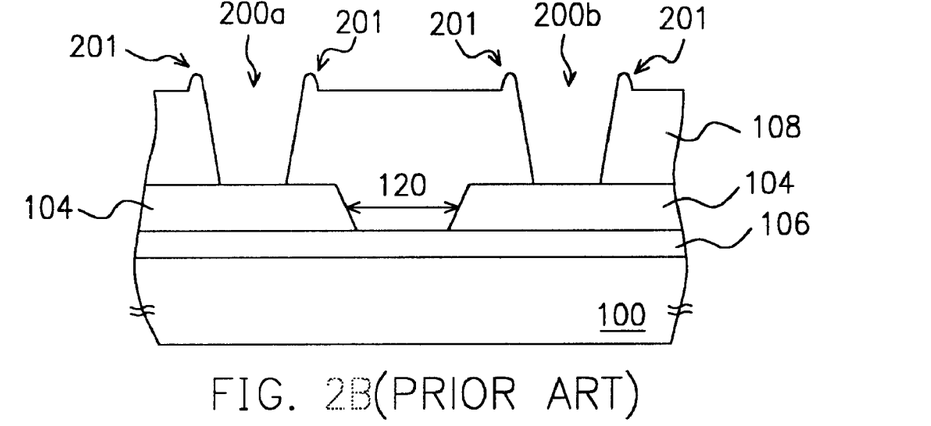
Figure 2C:
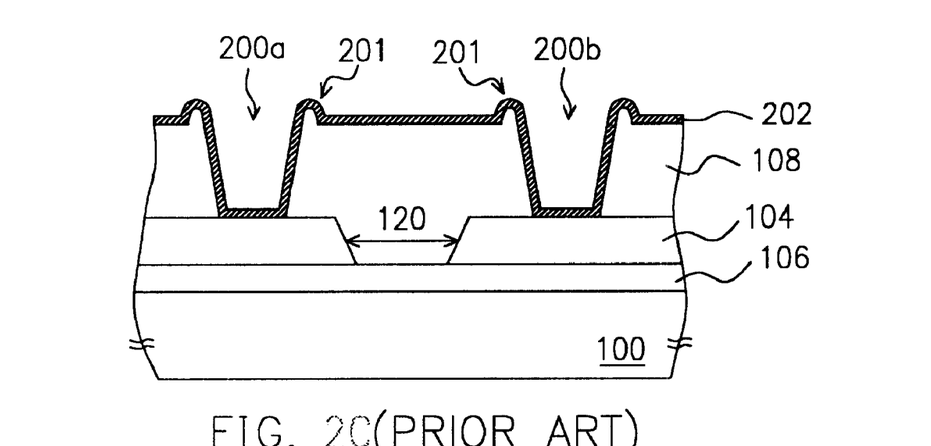

FIGS. 2A to 2C are schematic cross-sectional views along line I–I" of FIG. 1 showing the steps for repairing a broken data line using a laser beam. A data line 104 having a broken region 120 on the dielectric layer 106 of a substrate board 100 is shown in FIGS. 1 and 2A. The dielectric layer 106 and the gate insulation layer of the thin film transistor 101 are formed together. The data line 104 further includes another dielectric layer 108 formed in the same process of depositing a protective layer between the thin film transistor 101 and the pixel electrode 110.

To carry out a laser repair, openings 200a and 200b are formed in the dielectric layer 108 above the data line 104 near each end of the broken region 120 using a laser as shown in FIG. 2B so that a portion of the data line 104 is exposed. Since the openings 200a and 200b are formed by a laser burning operation, some material from the dielectric layer 108 piles up to form protruding ledges 201 near the upper corners.

As shown in FIG. 2C, a laser chemical vapor deposition (laser CVD) is carried out to form a conductive layer 202 over the interior surface of the openings 200a and 200b and the exposed dielectric layer 108. Through the conductive layer 202, broken ends of the data line 104 within the broken region 120 are reconnected electrically.

Due to the formation of protruding ledges 201 near the upper corners of the openings 200a and 200b, the conductive layer 202 formed by laser CVD also includes a prominent peak or spike there. The pointed peak or spike in the protruding area is electrically conductive and hence may contact with color filter to form a short circuit route. Ultimately, performance of the device is affected. Occasionally, the protrusion 201 may even lead to a short circuit between the upper and lower panel of a liquid crystal display. In addition, if the broken region within the data line 104 is too long, a conventional laser CVD may not bridge the gap reliably. Hence, yield of the laser repair is often compromised.

SUMMARY OF INVENTION

Accordingly, one object of the present invention is to provide a laser repairing method capable of reconnecting a broken data line without leading to possible subsequent short-circuiting between the upper and lower substrate board of a liquid crystal display panel.

A second object of this invention is to provide a laser repair facilitated pixel structure capable of tackling low yield problem resulting from the appearance of a long broken section on the data line being repaired.

To achieve these and other advantages and in accordance with the purpose of the invention, as embodied and broadly described herein, the invention provides a pixel structure on a substrate board. The pixel structure includes a thin film transistor, a scan line, a pixel electrode, a data line, a conductive line, a first dielectric layer and a second dielectric layer. The thin film transistor is formed over the substrate board. The thin film transistor further includes a gate electrode, a source terminal and a drain terminal. The scan line is formed over the substrate board and electrically connected to the gate electrode. The pixel electrode is formed over the substrate board and positioned next to the thin film transistor. The data line is formed over the substrate board and electrically connected to the pixel electrode via the source/drain terminals. The conductive line is formed underneath the data line. The conductive line has a connective region and a repair section at each end of the connective region. The repair sections protrude over the data line covered range. The repair section at each end of the conductive line may form on the same side as the data line or on the opposite side of the data line. Alternatively, the conductive line may be designed to have a width greater than the data line so that the conductive line outside the data line covered area can also serve as part of the repair section. The first dielectric layer is formed over the substrate board for electrically isolating the conductive line from the data line. The second dielectric layer is also formed over the substrate board to cover the data line. The two repair sections at each end of the conductive line within the pixel structure serve as areas for laser repair according to this invention.

When a break in the data line occurs, the broken data line is repaired by carrying out the following steps. First, the first dielectric layer and the second dielectric layer above the two repair sections are burnt away using a laser beam to form a first opening and a second opening that expose the data line and repair section. Thereafter, a laser chemical vapor deposition is carried out to form a conductive layer over the exposed surface inside the first opening and the second opening. Hence, the two repair sections and the data line are electrically connected. Through the special structural design between the conductive line and the repair sections, the data line can be easily repaired.

This invention provides an alternative pixel structure on a substrate board. The pixel structure includes a thin film transistor, a scan line, a pixel electrode, a data line, a conductive line, a conductive structure, a first dielectric layer and a second dielectric layer. The thin film transistor is formed over the substrate board. The thin film transistor further includes a gate electrode, a source terminal and a drain terminal. The scan line is formed over the substrate board and electrically connected to the gate electrode. The pixel electrode is formed over the substrate board and positioned next to the thin film transistor. The data line is formed over the substrate board and electrically connected to the pixel electrode via the source/drain terminals. The conductive line is formed underneath the data line. The conductive line has a connective region. Each end of the connective region of the conductive line has a contact section and a repair section. The contact section and the repair section protrude over the data line covered range. The contact section and the repair section at each end of the conductive line may form on the same side as the data line or on the opposite side of the data line. Alternatively, the conductive line may be designed to have a width greater than the data line so that the conductive line outside the data line covered area can also serve as part of the repair section or contact section. The conductive structure is formed over the contact section of the conductive line so that the contact section and the data line are electrically connected. The first dielectric layer is formed over the substrate board for electrically isolating the conductive line from the data line. The second dielectric layer is also formed over the substrate board to cover the data line. The repair section at each end of the conductive line within the pixel structure serves as an area for laser repair according to this invention.

When a break in the data line occurs, the broken data line is repaired according to the following steps. First, the first dielectric layer and the second dielectric layer above the repair section is burnt away using a laser beam to form an opening that exposes the data line and repair section. Thereafter, a laser chemical vapor deposition is carried out to form a conductive layer over the exposed surface inside the opening. Hence, the repair section and the data line are electrically connected. Through the special structural design between the conductive line, the contact section, and the repair section, the data line can be easily repaired.

This invention also provides a laser repair method. First, a substrate board is provided. The substrate board includes a distributing wire having a broken region and a dielectric layer that covers the distributing wire. To repair the broken distributing wire, an opening is formed in the dielectric layer within the broken region by laser burning. The opening exposes not only the broken region, but also exposes a portion of the distributing wire at each end of the broken region. Thereafter, a laser chemical vapor deposition is carried out to form a conductive line over the exposed broken region and the broken ends of the distributing wire so that the broken distributing wire is electrically reconnected through the conductive line.

The laser repair method according to this invention is capable of preventing the formation of spikes that may lead to point electric discharge or short-circuiting between the upper and lower substrate board of a liquid crystal display panel.

In a first embodiment of the laser repair facilitated pixel structure and repairing method according to this invention, the repair conductive line and the scan lines are formed in the same process and both ends of the conductive line are designed to be a laser repair region. Hence, any broken data line can be repaired within the small area of the two laser-repair regions. For a larger broken wire, the repairing process will not directly affect production.

In a second embodiment of the laser repair facilitated pixel structure and repairing method according to this invention, the repair conductive line and the scan lines are formed in the same process. Moreover, one end of the conductive line is electrically connected to the data line through a conductive structure while the other end of the conductive line is designed to be a laser-repair region. Hence, any broken data line can be repaired within the small area of a single laser-repair region. For a larger broken wire, the repairing process will not directly affect production.

It is to be understood that both the foregoing general description and the following detailed description are exemplary, and are intended to provide further explanation of the invention as claimed.

BRIEF DESCRIPTION OF DRAWING

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 3A:
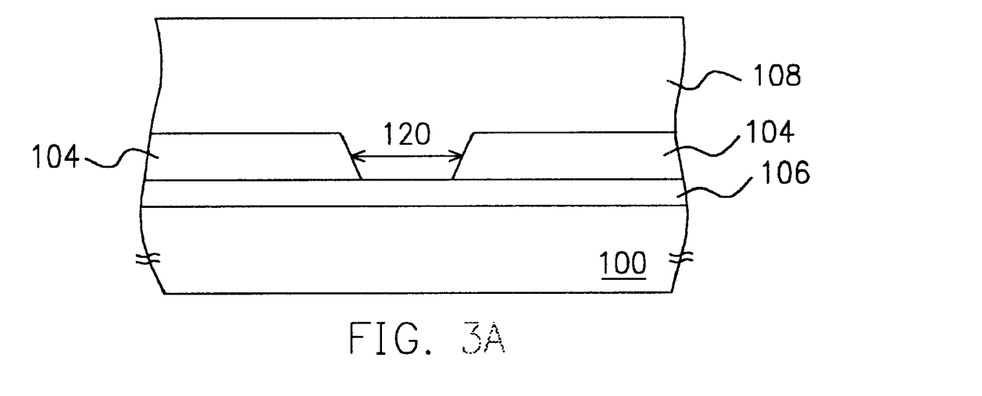
FIGS. 3A to 3C are schematic cross-sectional views along line I–I" of FIG. 1 showing the steps for repairing a broken data line using a laser beam according to a first embodiment of this invention.
Figure 3B:
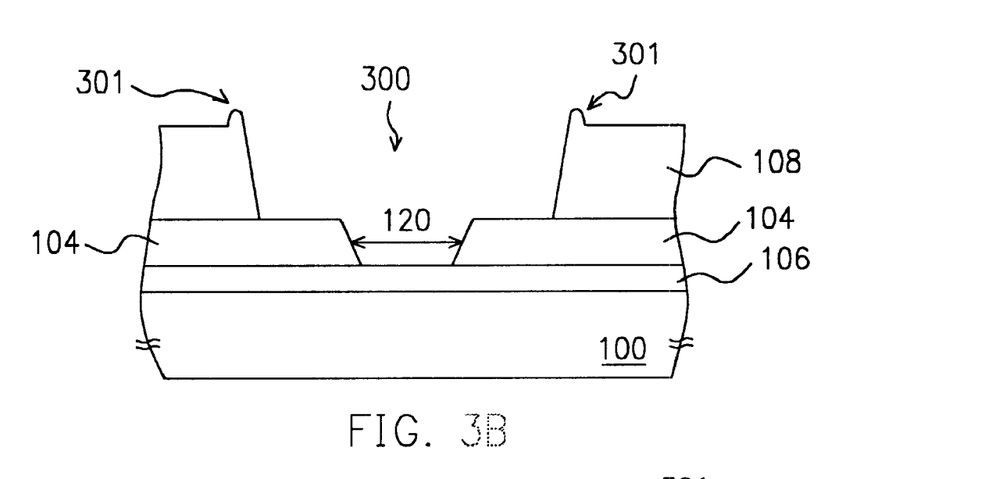
Figure 3C:
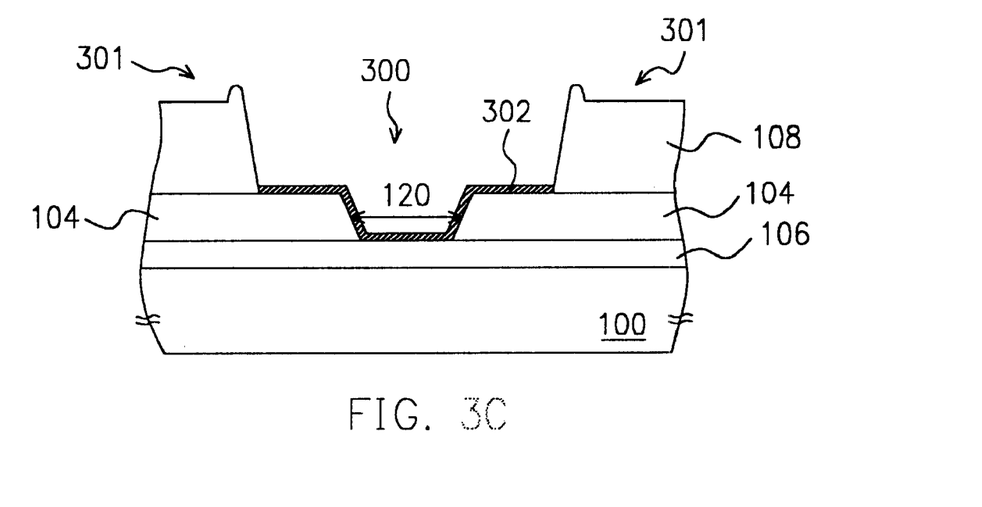

FIGS. 3A to 3C are schematic cross-sectional views along line I–I" of FIG. 1 showing the steps for repairing a broken data line using a laser beam according to a first embodiment of this invention. As shown in FIGS. 1 and 3A, a data distributing line 104 having a broken region 120 thereon is on a dielectric layer 106 above a substrate board 100. The dielectric layer 106 and gate insulation layer of a thin film transistor 101 are formed in the same fabrication process. Another dielectric layer 108 covers the data distributing line 104. The dielectric layer 108 and the passivation layer between the thin film transistor 101 and a pixel electrode 110 are formed in the same fabrication process.

To repair the data distributing line 104, an opening 300 is formed in the dielectric layer 108 within the broken region 120 as shown in FIG. 3B. The opening 300 exposes the broken region 120 and a portion of the data line 104 at each end of the broken region 120. The opening 300 in the dielectric layer 108 is formed, for example, by burning with a laser beam. In this embodiment, since the opening 300 is formed through a laser burning operation, some protruding material 301 piles up near the upper ledges of the opening 300.

As shown in FIG. 3C, a conductive layer 302 is formed on the exposed surface of the opening 300 so that the broken data distributing line 104 within the broken region 120 is electrically reconnected through the conductive layer 302. The conductive layer 302 is formed, for example, by conducting a laser chemical vapor deposition (laser CVD). A laser CVD is carried out by first providing a reactive gas over the substrate 100 and then activating the gas by laser pulses so that the reactive gas deposits into the opening 300.

In the first embodiment, a relatively large opening 300 is formed within the broken region 120 and around the broken ends of the data line 104. Hence, subsequent deposition of conductive material into the opening 300 to form a conductive layer 302 immediately reconnects the broken data line 104. Unlike a conventional repair method, this invention does not require any deposition of conductive material on a dielectric layer and the two data line exposed openings. Since the conductive layer 302 is not formed over the dielectric layer 108, the presence of protruding material 301 near the upper corners of the opening due to laser burning will not result in the formation of conductive spikes. Consequently, short circuit due to direct contact with a color filter or between the upper and lower substrate board of a liquid crystal display panel is prevented.

Figure 4:
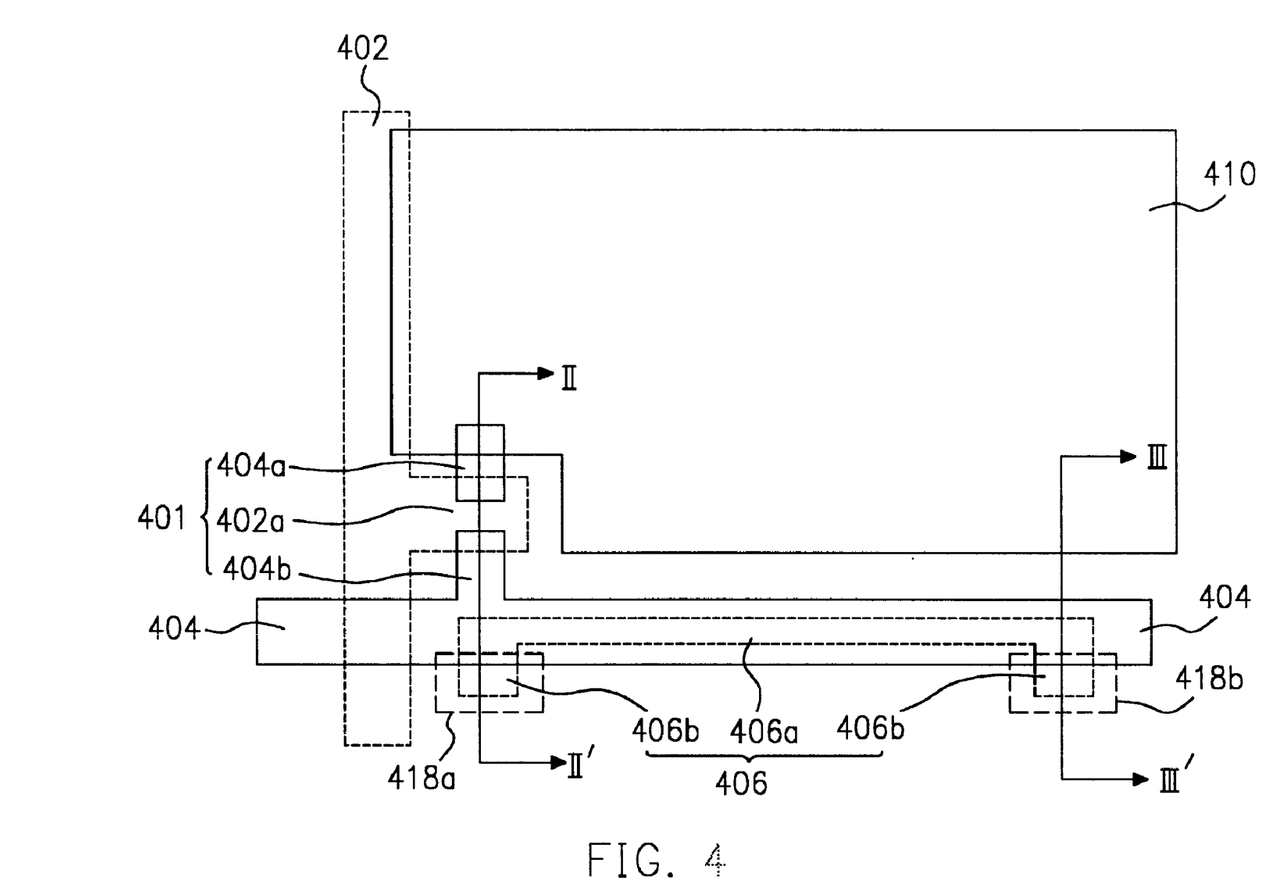
FIG. 4 is a schematic top view of a laser-repair facilitated pixel structure according to a second embodiment of this invention.
Figure 5A:
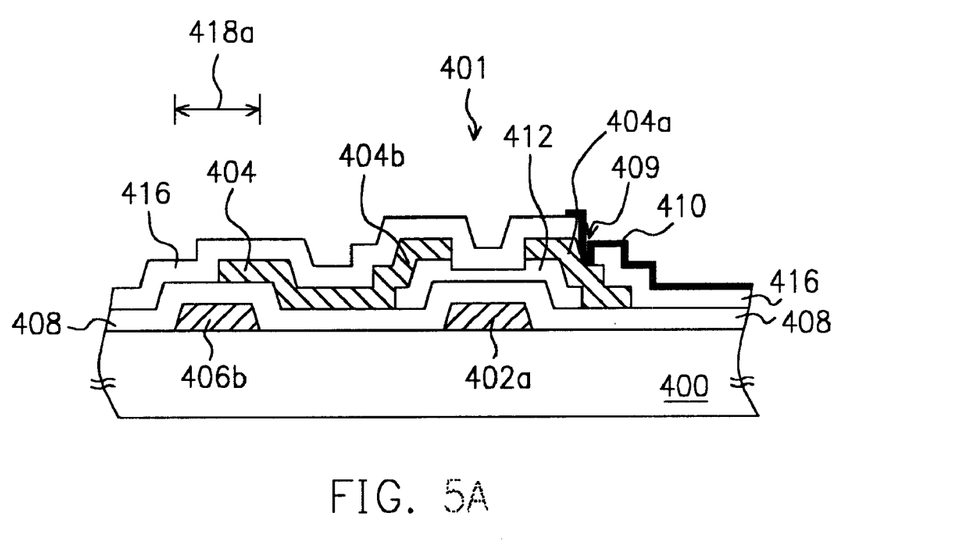
FIG. 5A is a cross-sectional view along line II–II" of FIG. 4.
Figure 5B:
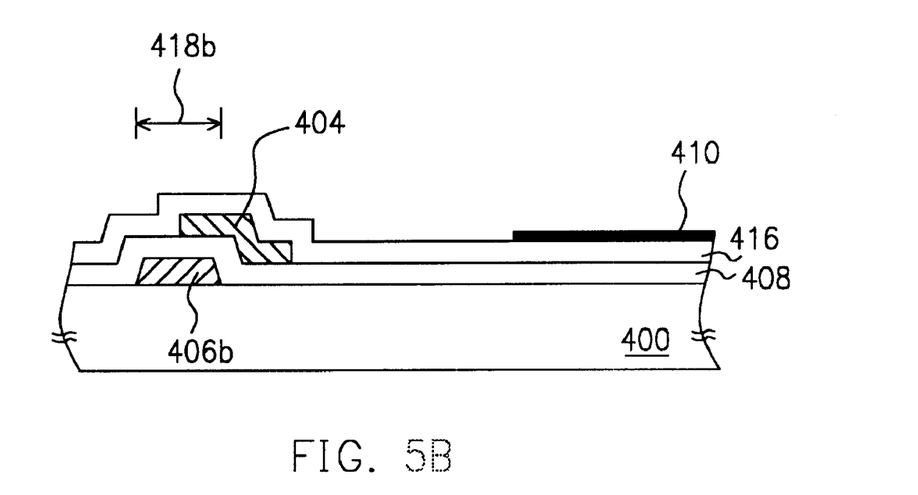
FIG. 5B is a cross-sectional view along line III–III" of FIG. 4.

FIG. 4 is a schematic top view of a laser-repair facilitated pixel structure according to a second embodiment of this invention. FIG. 5A is a cross-sectional view along line II–II" of FIG. 4. FIG. 5B is a cross-sectional view along line III–III" of FIG. 4. In FIGS. 4, 5A and 5B, the method of fabricating a pixel structure according to the second embodiment is shown. First, a substrate board 400 such as a transparent glass panel is provided. A scan line 402, the gate electrode 402a of a thin film transistor 401 and a conductive line 406 are formed on the substrate 400. The scan line 402 and the gate electrode 402a are electrically connected. The conductive line 406 is formed in a region where a data distributing line 404 is subsequently laid.

The conductive line 406 has a connective section 406a and a repair section 406b at each end of the connective section 406a. The two repair sections 406b at each end of the conductive line 406 have a width greater than the connective section 406a. Thus, the area covered by the repair section 406b of the conductive line 406 is greater than the data line 404 covered area after the data line 404 is formed over the conductive line 406. In other words, a portion of the repair section 406b is outside the data line 404 covered area.

A first dielectric layer 408 that covers the scan line 402, the gate electrode 402a of the thin film transistor 401, and the conductive line 406, is formed over the substrate 400. The first dielectric layer 408 is a silicon nitride layer, for example. The dielectric layer 408 covering the gate electrode 402a serves also as an insulator.

A channel layer 412, for example an amorphous silicon layer, is formed over the first dielectric layer 408 above the gate electrode 402a. Source/drain terminals 404b/404a are formed over the channel layer 412. In the meantime, a data distributing line 404 is formed over the first dielectric layer 408. The source terminal 404b and the data distributing line 404 are electrically connected. The data distributing line 404 covers the connective section 406a and a portion of the repair sections 406b of the conductive line 406. The conductive line 406 and the data distributing line 404 are electrically isolated from each other through the first dielectric layer 408.

A second dielectric layer 416 is formed over the substrate 400. The second dielectric layer 416 covers the data distributing line 404, the source/drain terminals 404b/404a and the channel layer 412. The second dielectric layer 416 is a passivation layer that protects the source/drain terminals 404b/404a and the channel layer 412.

An opening 409 is formed in the passivation layer above the drain terminal 404a. The opening 409 exposes a portion of the drain terminal 404a. Finally, a pixel electrode 410 is formed over the substrate board 400. The pixel electrode 410 and the drain terminal 404a are electrically connected through a bridge of material through the opening 409. The pixel electrode 410 is made from a material such as indium-tin oxide or indium-zinc oxide.

In the pixel structure, the thin film transistor 401 is controlled by signals on the scan line 402 and the data distributing line 404. The pixel electrode 410 and the thin film transistor 401 are positioned next to each other. In particular, the conductive line 406 lies underneath the data distributing line 404 and the two repair sections 406b at each end of the conductive line 406 exceed the data line 404 covered area. The two repair sections 406b also serve as laser repair regions 418a, 418b for conducting a laser repair.

Figure 6A:
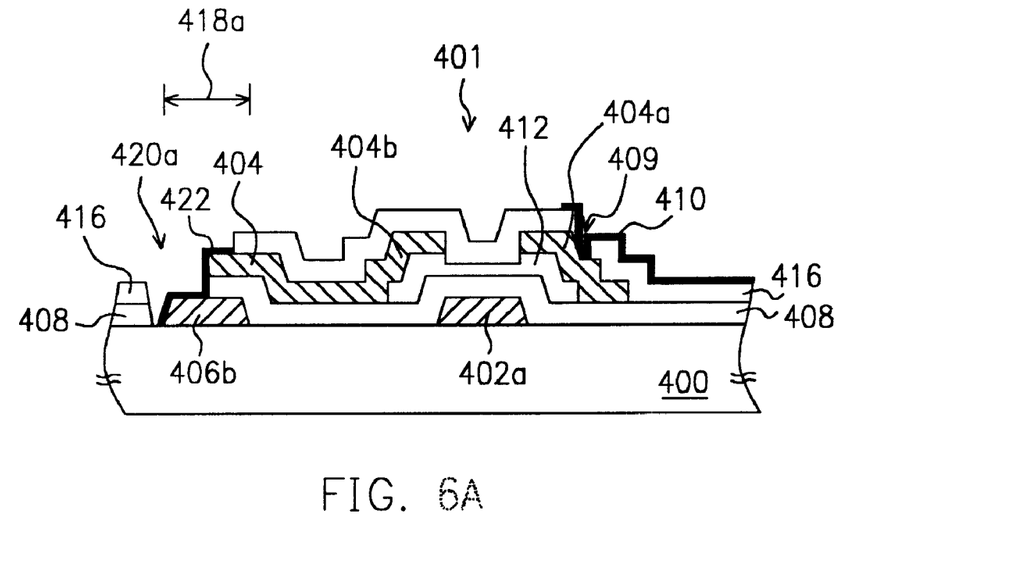
FIGS. 6A and 6B are cross-sectional views along line II–II" and line III–III" of FIG. 4 showing a method of repairing the pixel structure shown in FIG. 4.
Figure 6B:
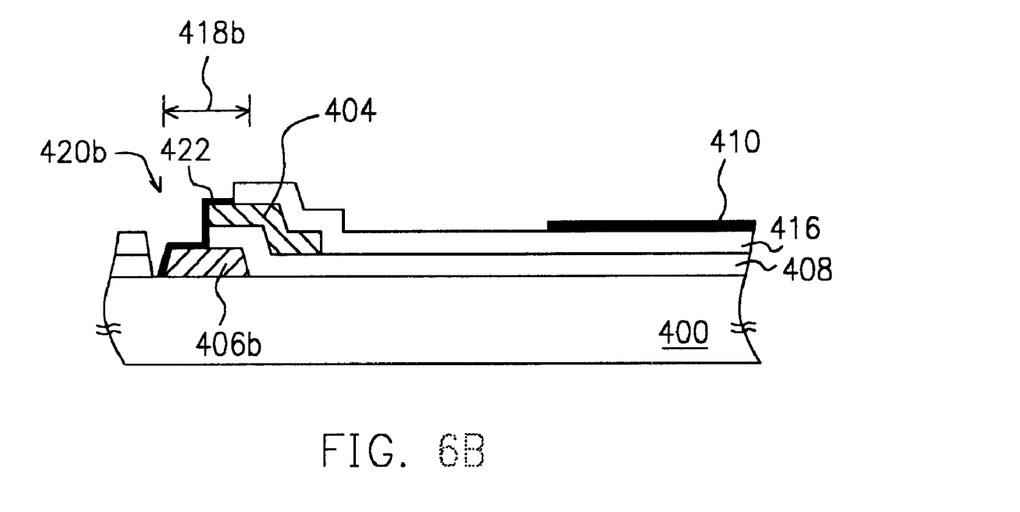

FIGS. 6A and 6B are cross-sectional views along line II–II" and line III–III" of FIG. 4 showing a method of repairing the pixel structure shown in FIG. 4. As shown in FIG. 4, the data distributing line 404 within the pixel structure may be broken occasionally. To repair the broken distributing data line 404, a first opening 420a and a second opening 420b are formed in the first dielectric layer 408 and the second dielectric layer 416 within the laser repair regions 418a and 418b as shown in FIGS. 6A and 6B. Hence, the repair section 406b and a portion of the data distributing line 404 are exposed. The first opening 420a and the second opening 420b are formed, for example, by conducting a laser burning operation.

Thereafter, a conductive layer 422 is formed over the exposed surface of the first opening 420a and the second opening 420b so that the repair section 406b and the data distributing line 404 are electrically connected. The conductive layer 422 is formed, for example, by conducting a laser chemical vapor deposition. A laser CVD is carried out by first providing a reactive gas over the substrate 400 and then activating the gas by laser pulses so that the reactive gas deposits into the first opening 420a and the second opening 420b.

Since the repair sections 406a, 406b have a special design that permits the data distributing line 404 to connect electrically with the conductive line 406 through a laser repair operation, any broken data distributing line 404 inside the pixel structure may be repaired.

Figure 7:
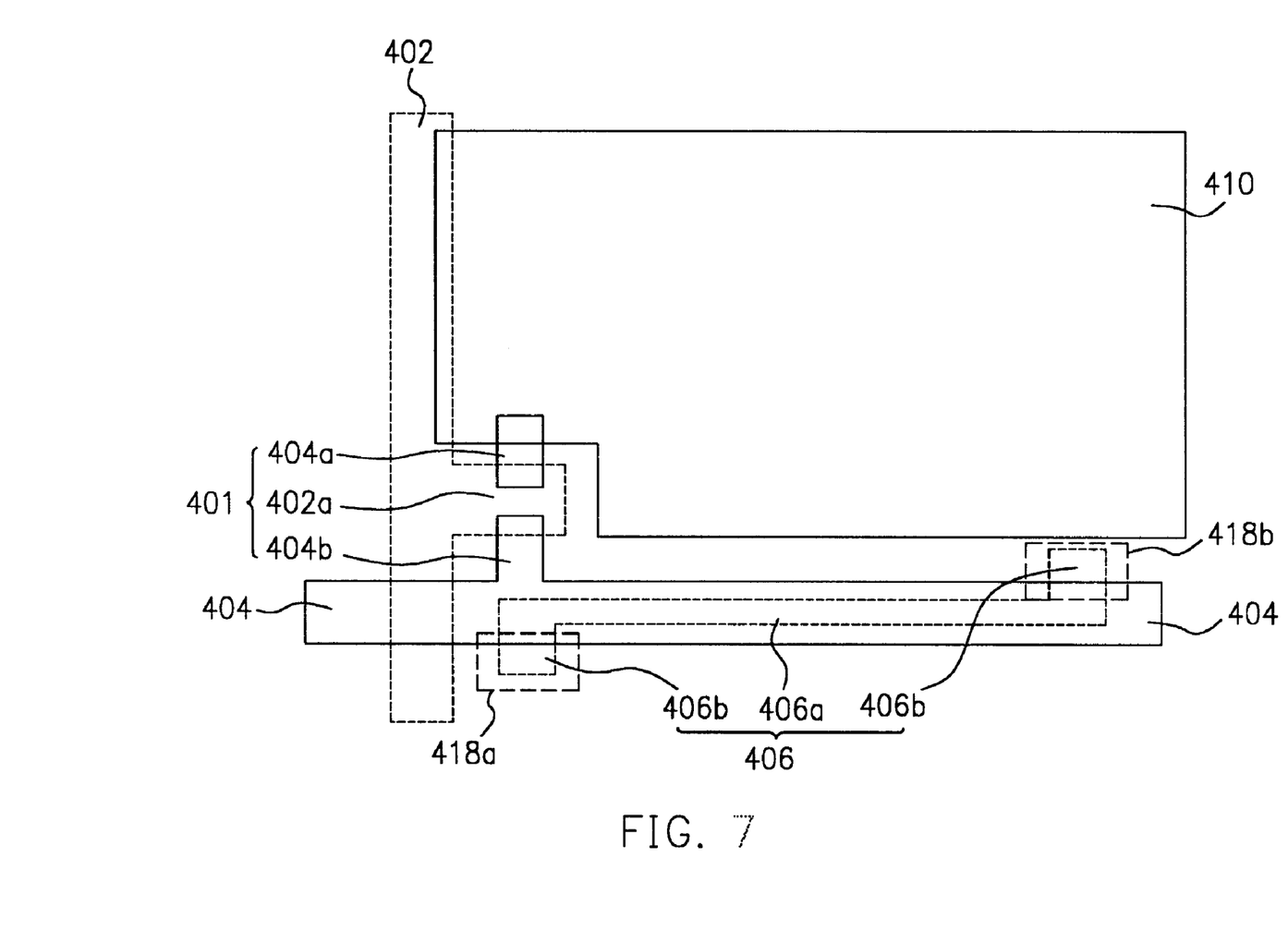
FIG. 7 is a schematic top view of an alternative laser repair facilitated pixel structure according to the second embodiment of this invention.

FIG. 7 is a schematic top view of an alternative laser-repair facilitated pixel structure according to the second embodiment of this invention. As shown in FIG. 7, the repair sections 406a and 406b at each end of the conductive line 406 may be on the opposite side of the data distributing line 404, rather than on the same side of the data distribution line 404 (as shown in FIG. 4). In addition, the conductive line 406 may be designed to have a width greater than the data distributing line 404 so that the excess portion of the conductive line 406 may provide more repair area in the repair section.

Figure 8:
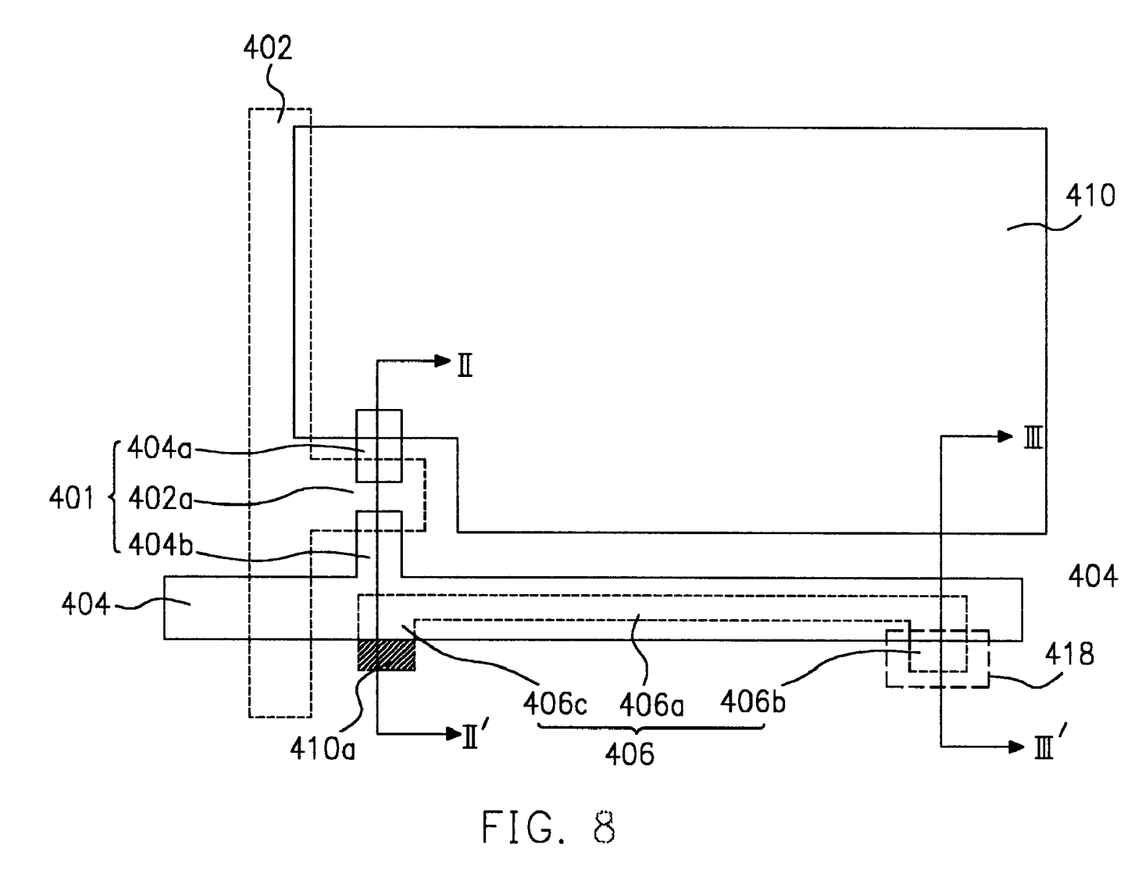
FIG. 8 is a schematic top view of a laser-repair facilitated pixel structure according to a third embodiment of this invention.
Figure 9A:
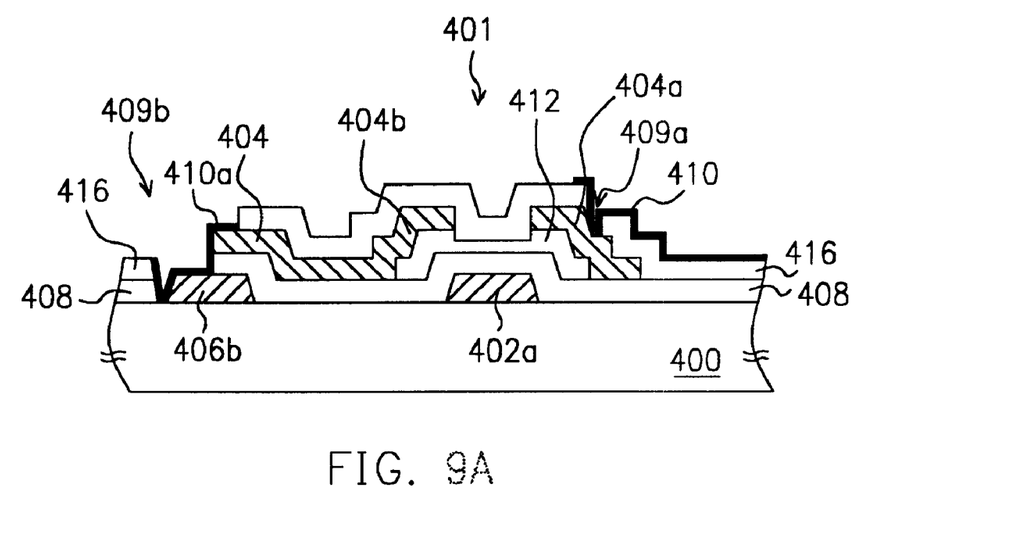
FIGS. 9A and 9B are cross-sectional views along line II–II" and line III–III" of FIG. 8.
Figure 9B:
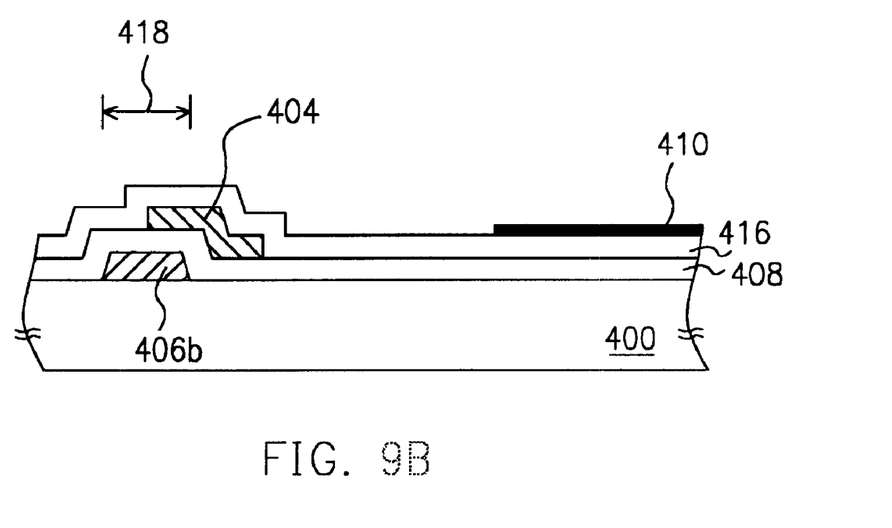

FIG. 8 is a schematic top view of a laser-repair facilitated pixel structure according to a third embodiment of this invention. FIGS. 9A and 9B are cross-sectional views along line II–II" and line III–III" of FIG. 8, In FIGS. 8, 9A and 9B, the method of fabricating a pixel structure according to the third embodiment is shown. First, a substrate board 400 such as a transparent glass panel is provided. A scan line 402, the gate electrode 402a of a thin film transistor 401 and a conductive line 406 are formed over the substrate board 400. The scan line 402 and the gate electrode 402a are electrically connected. The conductive line 406 is formed in a position underneath a subsequently formed data distributing line 404.

The conductive line 406 has a connective section 406a and, at the ends of the connective section 406a, a repair section 406b and a contact section 406c. The repair section 406b and the contact section 406c at each end of the conductive line 406 have a width greater than the connective section 406a. Thus, the width of the repair section 406b and the contact section 406c of the conductive line 406 is greater than the data line 404 covered area after the data line 404 is formed over the conductive line 406. In other words, a portion of the repair section 406b and the contact section 406c is outside the data line 404 covered area.

A first dielectric layer 408 that covers the scan line 402, the gate electrode 402a of the thin film transistor 401 and the conductive line 406 is formed over the substrate 400. The first dielectric layer 408 is a silicon nitride layer, for example. The dielectric layer 408 covering the gate electrode 402a serves also as an insulator.

A channel layer 412, for example an amorphous silicon layer, is formed over the first dielectric layer 408 above the gate electrode 402a. Source/drain terminals 404b/404a are formed over the channel layer 412. In the meantime, a data distributing line 404 is formed over the first dielectric layer 408. The drain terminal 404a and the data distributing line 404 are electrically connected. The data distributing line 404 covers the connective section 406a and a portion of the repair section 406b and the contact section 406c of the conductive line 406. The conductive line 406 and the data distributing line 404 are electrically isolated from each other through the first dielectric layer 408.

A second dielectric layer 416 is formed over the substrate 400. The second dielectric layer 416 covers the data distributing line 404, the source/drain terminals 404b/404a and the channel layer 412. The second dielectric layer 416 is a passivation layer that protects the source/drain terminals 404b/404a and the channel layer 412.

An opening 409a that exposes a portion of the drain terminal 404a is formed in the second dielectric layer 416 above the drain terminal 404a. At the same time, another opening 409b that exposes the data distributing line 404 and the contact section 406c of the conductive line 406 is formed in the first dielectric layer 408 and the second dielectric layer 416 above the contact section 406c. Finally, a pixel electrode 410 is formed over the substrate board 400 and a pixel electrode material layer 410a is formed inside the opening 409b. The pixel electrode 410 and the drain terminal 404a are electrically connected through a bridge of material through the opening 409a. Similarly, the contact section 406c of the conductive line 406 and the data distributing line 404 are electrically connected through the pixel electrode material layer 410a inside the opening 409b. The pixel electrode 410 is made from a material such as indium-tin oxide or indium-zinc oxide.

In the pixel structure, the thin film transistor 401 is controlled by signals on the scan line 402 and the data distributing line 404. The pixel electrode 410 and the thin film transistor 401 are positioned next to each other. In particular, the conductive line 406 lies underneath the data distributing line 404 and the width of the repair section 406b and the contact section 406c at each end of the conductive line 406 exceeds the data line 404 covered area. Furthermore, the contact section 406c and the data distributing line 404 are electrically connected through the pixel electrode material layer 410a. The repair section 406b also serves as a laser repair region 418 for conducting a laser repair.

Figure 10:
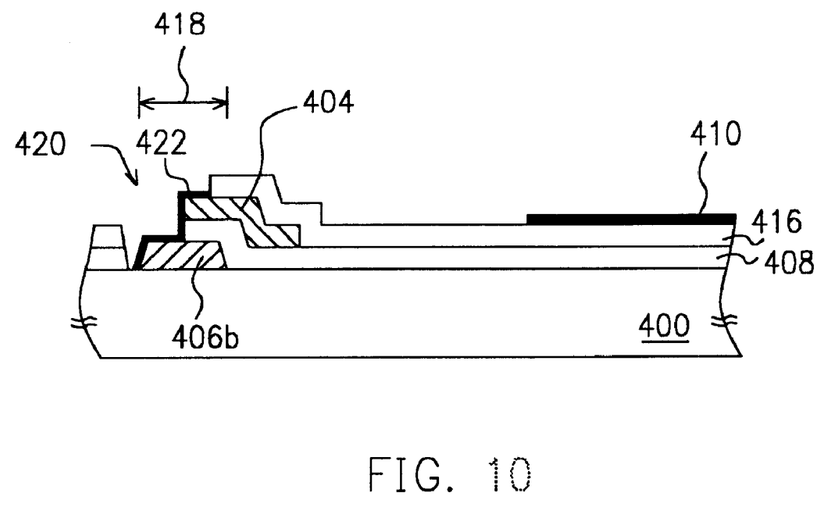
FIG. 10 is a cross-sectional view along line III–III" of FIG. 8 showing a method of repairing the pixel structure shown in FIG. 8.

FIG. 10 is a cross-sectional view along line III–III" of FIG. 8 showing a method of repairing the pixel structure shown in FIG. 8. As shown in FIG. 8, the data distributing line 404 within the pixel structure 404 may be broken occasionally. To repair the broken data distributing line 404, an opening 420 is formed in the first dielectric layer 408 and the second dielectric layer 416 within the laser repair region 418 as shown in FIG. 10. Hence, the repair section 406b and a portion of the data distributing line 404 are exposed. The opening 420 is formed, for example, by conducting a laser burning operation.

Thereafter, a conductive layer 422 is formed over the exposed surface of the opening 420 so that the repair section 406b and the data distributing line 404 are electrically connected. The conductive layer 422 is formed, for example, by conducting a laser chemical vapor deposition. A laser CVD is carried out by first providing a reactive gas over the substrate 400 and then activating the gas by laser pulses so that the reactive gas deposits into the opening 420.

Since the contact section 406c at one end of the conductive line 406 and the data distributing line 404 have already been electrically connected through the pixel electrode material layer 410a, only a single laser repair operation in the laser repair region 408 is required to rejoin the broken data line 404. After a laser repair, the repair region 406b of the conductive line 406 is electrically connected to the data distributing line 404. Hence, using the conductive line 406 and the special contact section 406c and repair section 406b design, any broken data distributing line 404 inside the pixel structure is easily repaired.

Figure 11:
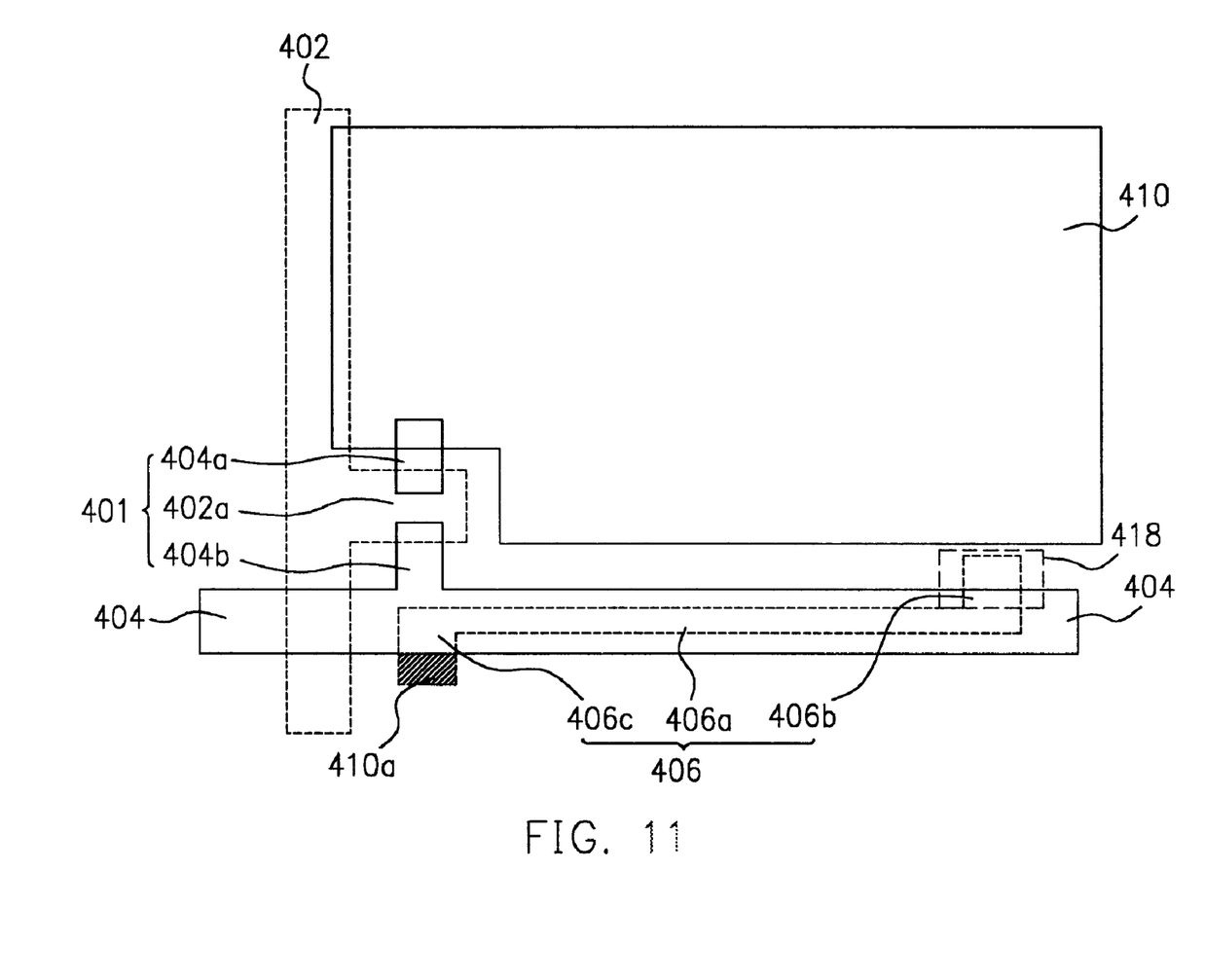
FIG. 11 is a schematic top view of an alternative laser-repair facilitated pixel structure according to the third embodiment of this invention.

FIG. 11 is a schematic top view of an alternative laser-repair facilitated pixel structure according to the third embodiment of this invention. As shown in FIG. 11, the repair sections 406b and the contact section 406c at each end of the conductive line 406 may be on the opposite side of the data distributing line 404 rather than on the same side of the data distribution line 404 (as shown in FIG. 8). In addition, the conductive line 406 may be designed to have a width greater than the data distributing line 404 so that the excess portion of the conductive line 406 may provide more repair area in the repair section 406b or the contact section 406c.

In conclusion, major advantages of this invention includes:

1. The laser repair method is capable of preventing the formation of spike discharge and short circuit between the upper and lower substrate board of a liquid crystal display panel.
2. In the laser repair facilitated pixel structure, the scan line and the conductive line for repairing a broken data line are formed concurrently. Moreover, the two ends of the conductive line are designed to be a laser repair region so that laser repair is carried out within the relatively small area of the two laser repair regions. In other words, the repair operation will not directly affect yield even if the broken region is large.
3. In an alternative laser repair facilitated pixel structure, the scan line and the conductive line for repairing a broken data line are formed concurrently. Furthermore, one end of the conductive line is electrically connected to the data distributing line through a conductive structure while the other end of the conductive line is designed to be a laser repair region. Hence, repair can be carried out within the small laser repair region when the data distributing line is broken somewhere.

In the embodiment of this invention, the common five-mask process of the thin film transistor is used to form the pixel structure. However, other thin film transistor processes such as a four-mask thin film transistor process or a thin film transistor process that uses an etching top layer may also be employed to form the pixel structure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure on a substrate board, comprising:
   a thin film transistor over the substrate board, wherein the thin film transistor has a gate electrode, a source terminal, and a drain terminal;
   a scan line over the substrate board, wherein the scan line and the gate electrode are electrically connected;
   a pixel electrode over the substrate board, wherein the pixel electrode is positioned close to the thin film transistor;
   a data distributing line over the substrate board, wherein the data distributing line and the pixel electrode are electrically connected to the source terminal and the drain terminal respectively;
   a conductive line underneath the data distributing line, wherein the conductive line has a connective section and a repair section at each end of the connective section, and the repair section covers an area larger than the data distributing line;
   a first dielectric layer above the substrate board for isolating the conductive line and the data distributing line electrically; and
   a second dielectric layer above the substrate board that covers the data distributing line.

2. The pixel structure of claim 1, wherein the conductive line has a width greater than the data distributing line and the region in the conductive line in excess of the data distributing line serves as part of the repair section.

3. The pixel structure of claim 1, wherein the conductive line and the scan line are made using an identical material.

4. The pixel structure of claim 1, wherein material forming the pixel electrode is selected from a group consisting of indium-tin oxide and indium-zinc oxide.

5. A pixel structure on a substrate board, comprising:
   a thin film transistor over the substrate board, wherein the thin film transistor has a gate electrode, a source terminal and a drain terminal;
   a scan line over the substrate board, wherein the scan line and the gate electrode are electrically connected;
   a pixel electrode over the substrate board, wherein the pixel electrode and the thin film transistor are close to each other;
   a data distributing line over the substrate board, wherein the data distributing line and the pixel electrode are electrically connected to the source terminal and the drain terminal respectively;
   a conductive line underneath the data distributing line, wherein the conductive line includes a connective section and, at each end of the connective section, a contact section and a repair section, and the contact section and the repair section occupy an area greater than the area covered by the data distributing line;
   a conductive structure over the contact section of the conductive line so that the contact section and the data distributing line are electrically connected; a first dielectric layer above the substrate board for isolating the conductive line and the data distributing line electrically; and
   a second dielectric layer above the substrate board that covers the data distributing line.

6. The pixel structure of claim 5, wherein the conductive line has a width greater than the data distributing line and the region in the conductive line in excess of the data distributing line serves as part of the repair section and the contact section.

7. The pixel structure of claim 5, wherein the conductive line and the scan line are made using an identical material.

8. The pixel structure of claim 5, wherein the conductive structure and the pixel electrode are made using an identical material.

9. The pixel structure of claim 5, wherein material forming the pixel electrode is selected from a group consisting of indium-tin oxide and indium-zinc oxide.

* * * * *